No. 863,374. PATENTED AUG. 13, 1907.
J. C. GAMEL, G. L. WILLIS & H. E. BONNER.
HAY PRESS.
APPLICATION FILED DEC. 26, 1906.
3 SHEETS—SHEET 1.
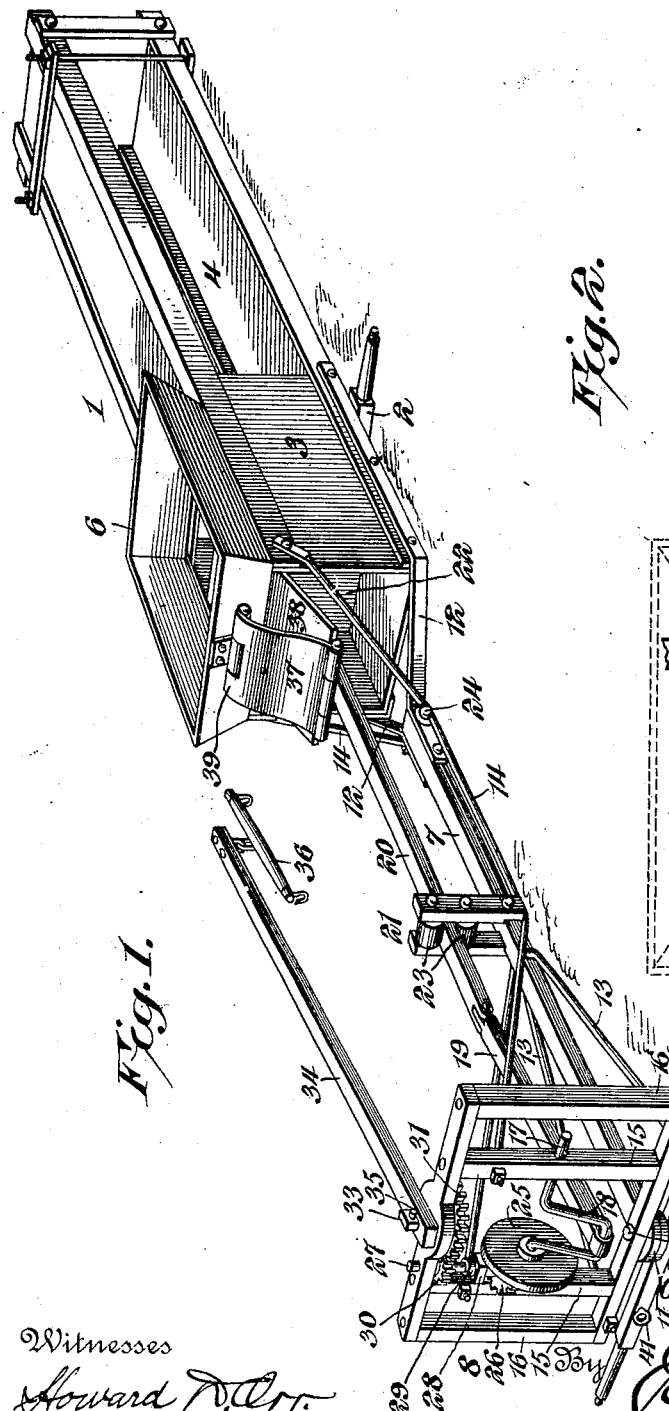
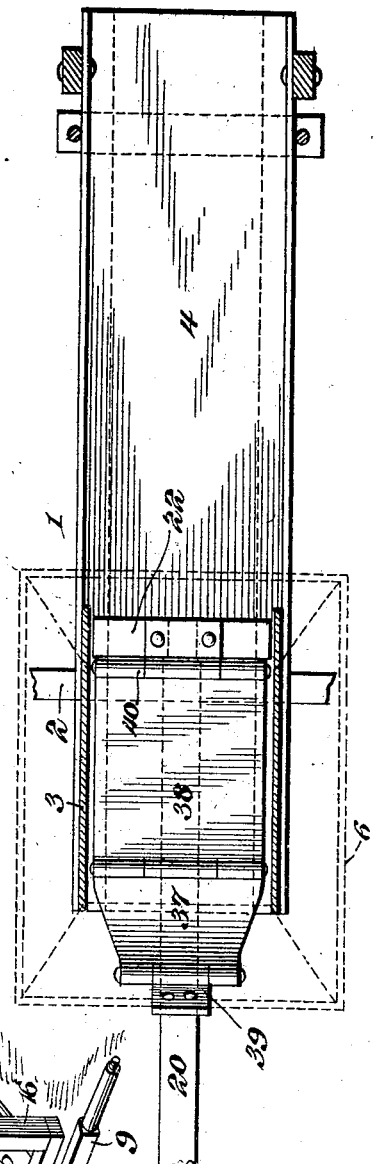

No. 863,374. PATENTED AUG. 13, 1907.
J. C. GAMEL, G. L. WILLIS & H. E. BONNER.
HAY PRESS.
APPLICATION FILED DEC. 26, 1906.
3 SHEETS—SHEET 2.
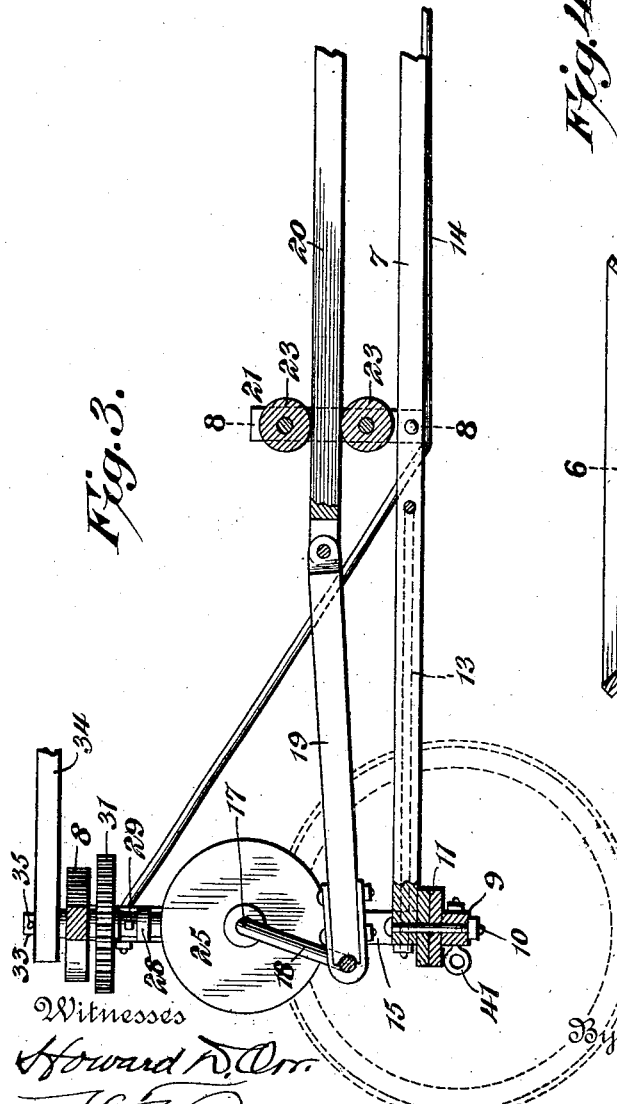
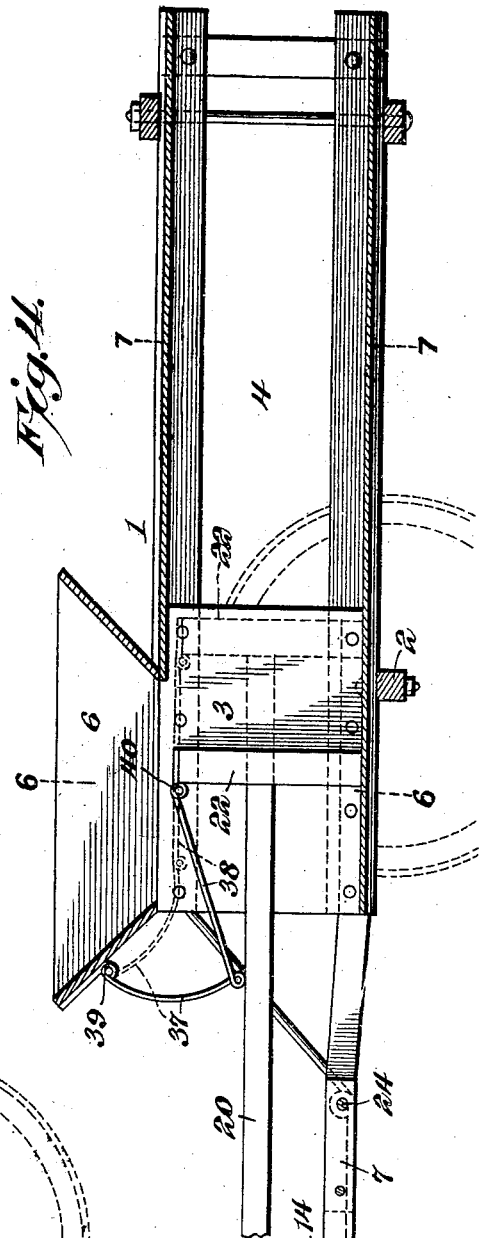

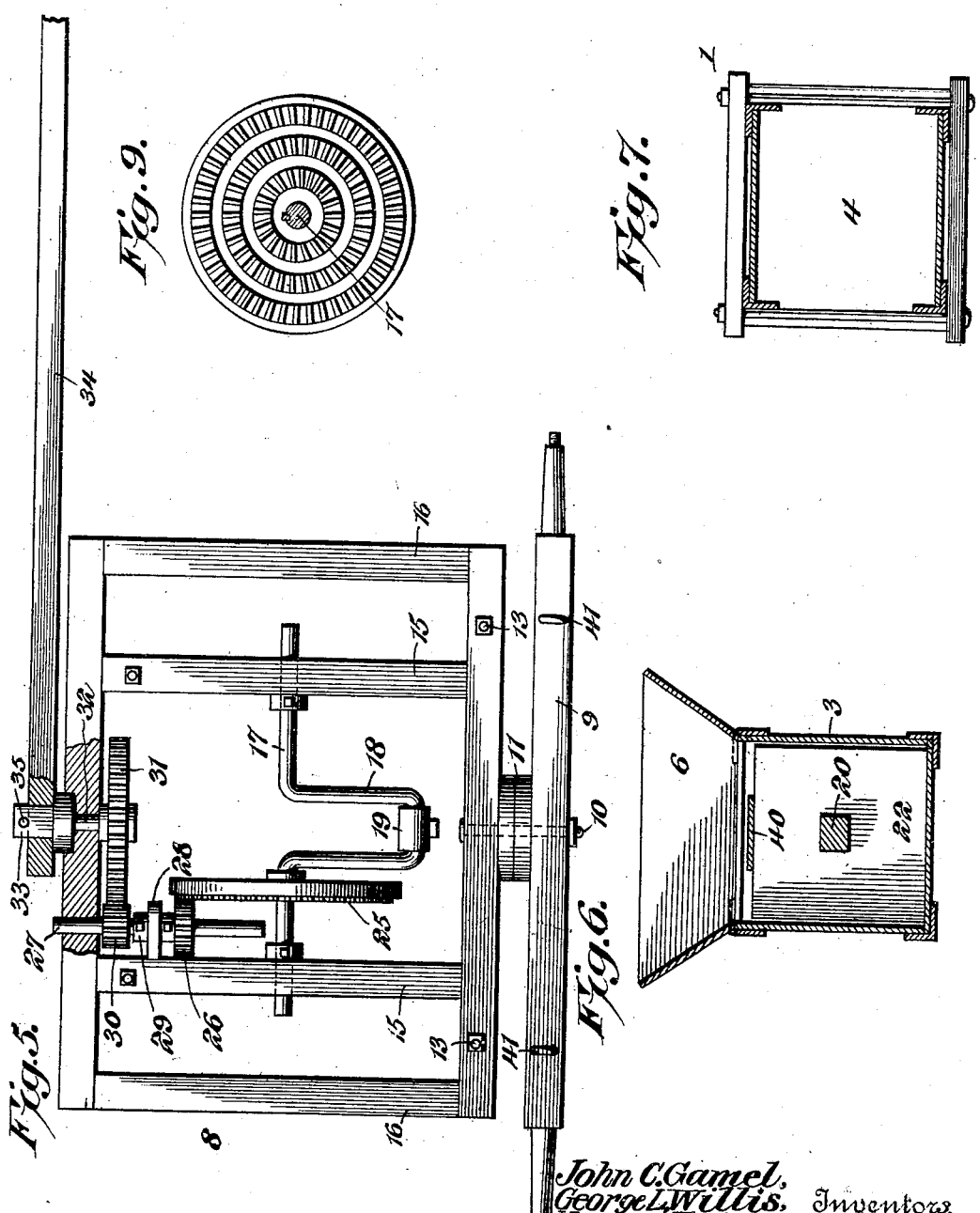

UNITED STATES PATENT OFFICE.

JOHN C. GAMEL, GEORGE L. WILLIS, AND HORACE E. BONNER, OF HUBBARD, TEXAS.

HAY-PRESS.

No. 863,374.  Specification of Letters Patent.  Patented Aug. 13, 1907.

Application filed December 26, 1906. Serial No. 349,427.

*To all whom it may concern:*

Be it known that we, JOHN C. GAMEL, GEORGE L. WILLIS, and HORACE E. BONNER, citizens of the United States, residing at Hubbard, in the county of Hill and State of Texas, have invented a new and useful Hay-Press, of which the following is a specification.

The invention relates to improvements in hay presses.

The object of the present invention is to improve the construction of hay presses, and to provide a simple, inexpensive and efficient one of great strength and durability, capable of rapidly baling hay and other material, and adapted to be adjusted to enable it to be run at different speeds.

A further object of the invention is to provide a hay press of this character, adapted to be readily mounted on wheels for enabling it to be conveniently transported from one place to another.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a press constructed in accordance with this invention, the carrying wheel being removed and the press being arranged for operation. Fig. 2 is a horizontal sectional view of the press frame, illustrating the arrangement of the apron for preventing the loose material from getting behind the plunger head or follower. Fig. 3 is a central longitudinal sectional view of the front portion of the hay press. Fig. 4 is a similar view of the rear portion thereof. Fig. 5 is a front elevation, partly in section. Fig. 6 is a transverse sectional view, taken substantially on the line 6—6 of Fig. 4. Fig. 7 is a similar view on the line 7—7 of Fig. 4. Fig. 8 is a detail sectional view, taken on the line 8—8 of Fig. 3. Fig. 9 is a detail view of the triple gear.

Like numerals of reference designate corresponding parts in all the figures of the drawings.

1 designates a press frame, designed to be constructed wholly of metal and mounted on a rear axle 2, which, in practice, will be provided with suitable carrying wheels. The press frame, which has a front press box 3 and a rear baling chamber 4, is provided with longitudinal angle iron beams, located at opposite sides of the press frame at the top and bottom thereof. The side walls and the bottom of the press box are preferably constructed of sheet steel, and a suitable hopper 6 is mounted upon the press box.

The inner or front end of the press frame is connected by a reach 7 with a front vertical frame 8, disposed transversely of the baling press and mounted upon a front axle 9, a king bolt 10 and a suitable fifth wheel 11 being provided to permit the front axle to swing horizontally. The front axle is adapted to receive suitable carrying wheels, which are removed to place the hay press upon the ground for use. The rear end of the reach is connected with the press frame at the bottom thereof by rearwardly diverging hounds or bars 12, having their front terminals bolted to the side faces of the reach. The rear portions of the bars 12 are arranged in parallelism and are bolted, or otherwise secured to the outer faces of the lower longitudinal beams of the press frame. The reach is also connected with the side portions of the front transverse frame 8 by means of hounds or braces 13, preferably consisting of a single rod, piercing the coupling at an intermediate point and having threaded terminals, which pierce the bottom of the vertical transverse frame 8, and are secured to the same by nuts. The coupling portion for connecting the front transverse frame with the press frame is reinforced and strengthened by longitudinal braces or truss rods 14, consisting of intermediate horizontal portions, which are connected with the reach at opposite sides thereof, and front and rear inclined portions, which are secured respectively to the transverse frame 8 and to the press frame. The hay press, however, does not require much bracing as all of the parts are constructed of metal, with the exception of the sweep hereinafter described, which is preferably constructed of wood.

The front transverse frame 8, which is rectangular, is composed of horizontal top and bottom bars and vertical inner and outer spaced side posts or bars 15 and 16. The inner vertical bars 15 are provided at opposite sides of the center of the transverse frame with suitable bearings for a crank shaft 17, having a central crank bend 18 and connected by a pitman rod or bar 19 with a plunger beam 20. The plunger beam 20, which is disposed horizontally, is slidable in an intermediate guide 21 and is provided with a suitable plunger head or follower 22, which operates within the press box. The intermediate guide is composed of vertical bars and upper and lower anti-friction rollers 23. The sides or bars of the guide are secured at their lower ends to the opposite side faces of the reach, and their lower edges engage the longitudinal braces at the front ends of the intermediate horizontal portions thereof. The rear ends of the intermediate horizontal portions of the longitudinal braces are engaged by one of the transverse bolts 24 for securing the rear bars or hounds 12 to the reach.

The crank shaft has keyed, or otherwise secured to it a vertically disposed triple gear 25, provided with three separate sets of teeth, any one of which is adapted to mesh with a vertically adjustable pinion 26, whereby the speed of the hay press may be varied to cause the press to run either fast or slow. The vertically adjustable pinion is mounted on a vertical side shaft 27, journaled in suitable bearings of the top bars of the transverse frame and a horizontal arm 28 of the proximate inner vertical bar 15. The shaft 27 is supported in its bearings by means of a collar 29, arranged to rest upon the arm 28, and secured to the shaft 27 by a set screw, or other suitable means. The upper portion of the side shaft 27 carries an upper pinion 30, which meshes with a horizontal gear 31 of a central vertical power shaft 32. The power shaft, which is journaled in suitable bearings of the top of the transverse frame, is provided above the same with a suitable head 33. The head 33 has a polygonal projecting portion to which the inner end of a sweep 34 is detachably secured. The inner end of the sweep is provided with a polygonal opening to fit the polygonal projecting portion of the central vertical shaft, and it is retained on the same by a key 35, or other suitable fastening device. The outer end of the sweep is provided with a swingletree 36 for the attachment of a horse, and it will be apparent that by adjusting the lower pinion vertically on the side shaft 27, the number of reciprocations or operations of the plunger for each revolution of the sweep may be varied.

The loose material is prevented from dropping back of the plunger head or follower by means of an apron, composed of two sections or plates 37 and 38, hinged together at their contiguous ends. The plate or section 37, which is curved, is hinged at its outer end 39 to the exterior of the front wall of the hopper, and the rear end 40 of the other plate or section 38, which is straight, is hinged to the plunger head or follower at the top thereof. The sectional apron, which is foldable, moves with the plunger beam, and forms a closure for preventing the hay, or other loose material from dropping behind the plunger head or follower.

When it is desired to move the hay press from one point or place to another, the wheels are placed on the spindles of the front and rear axles, and a team is hitched to the front axle, suitable couplings 41 being provided for this purpose.

Having thus fully described our invention, what we claim as new and desire to secure by Letters Patent, is:—

1. In a press of the class described, the combination of a press frame, a vertically disposed front frame, a reach coupling the front frame and the press frame together, a plunger beam, operating mechanism mounted on the front frame for actuating the plunger beam, a guide receiving the plunger beam and having side bars secured to and extending upward from the reach, and truss rods arranged at opposite sides of the press and consisting of intermediate horizontal portions and inclined end portions, the latter being secured to the front frame and the press frame and the intermediate portions extending beneath and engaging the lower ends of the side bars of the said guide.

2. In a press of the class described, the combination of a press frame, a front frame connected therewith, a horizontal crank shaft, a plunger beam actuated by the crank shaft, a vertical gear provided with a plurality of sets of teeth, an adjustable gear arranged to mesh with the different sets of teeth of the vertical gear, and means for rotating the adjustable gear.

3. In a press of the class described, the combination of a plunger, a horizontal crank shaft connected with the plunger, a vertical gear having a plurality of sets of teeth, a vertical shaft, an adjustable gear mounted on the vertical shaft and adapted to mesh with the different sets of teeth of the vertical gear, a central shaft, gearing connecting the said shafts, and a sweep for rotating the central shaft.

4. In a press of the class described, the combination of a press frame, a front frame connected therewith, a horizontal crank shaft mounted on the front frame and connected with the plunger beam, a vertical gear mounted on the crank shaft and provided at its outer face with a plurality of sets of teeth, a vertical shaft located beyond the vertical gear, a horizontal gear adjustable on the vertical shaft and arranged to mesh with the different sets of teeth of the vertical gear, a central vertical drive shaft, gearing connecting the vertical shafts, and means for rotating the drive shaft.

In testimony, that we claim the foregoing as our own, we have hereto affixed our signature in the presence of two witnesses.

JOHN C. GAMEL.
GEORGE L. WILLIS.
HORACE E. BONNER.

Witnesses:
JAY STANSELL,
S. W. MARTIN.